No. 734,739. PATENTED JULY 28, 1903.
W. C. NEWMAN.
EYEGLASSES.
APPLICATION FILED MAY 29, 1902.
NO MODEL.
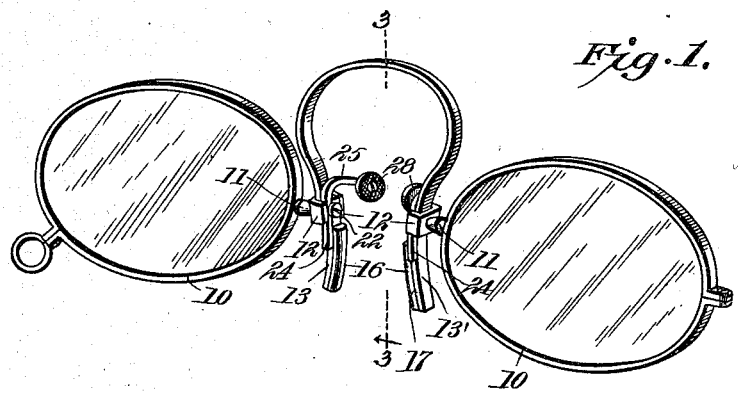
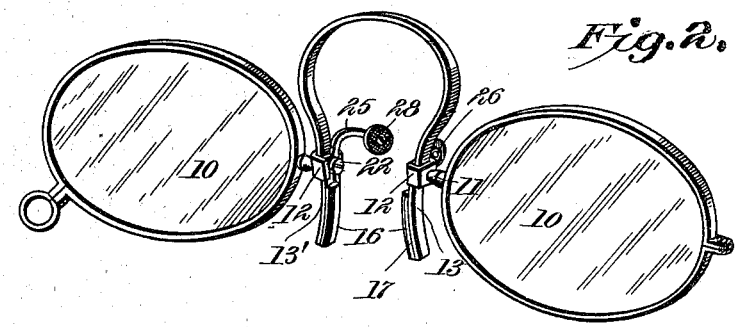
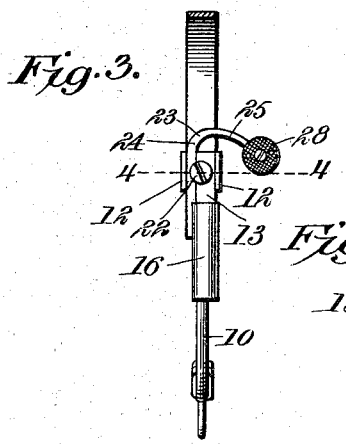
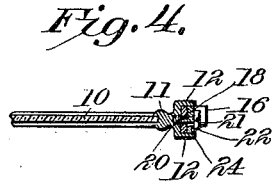
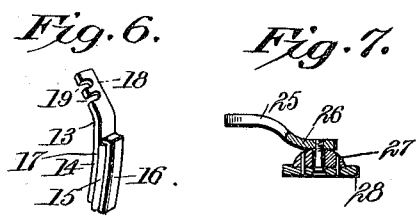
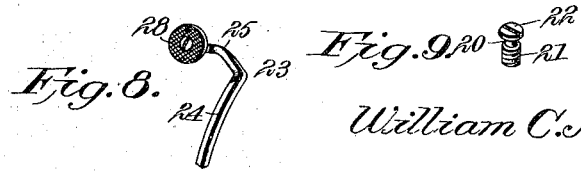
Witnesses
C. H. Walker.
F. S. Felt.
Inventor.
William C. Newman,
By Wm. S. Hodges
Attorney No. 734,739.

Patented July 28, 1903.

UNITED STATES PATENT OFFICE.

WILLIAM C. NEWMAN, OF HAGERSTOWN, MARYLAND.

EYEGLASSES.

SPECIFICATION forming part of Letters Patent No. 734,739, dated July 28, 1903.

Application filed May 29, 1902. Serial No. 109,481. (No model.)

*To all whom it may concern:*

Be it known that I, WILLIAM C. NEWMAN, of Hagerstown, in the county of Washington and State of Maryland, have invented certain new and useful Improvements in Eyeglasses; and I do hereby declare the following to be a full, clear, and exact description of the invention, such as will enable others skilled in the art to which it appertains to make and use the same.

This invention relates to certain new and useful improvements in eyeglasses.

The invention has for its object the production of a simple and inexpensive eyeglass which may be readily adjusted to bring the axis of the lenses in line with the pupil of the eyes of the wearer and also to provide means whereby said adjustment can be secured without substituting new parts.

A further object is to provide means for firmly and securely retaining the eyeglasses in their position on the nose of the wearer; and a further object is to provide means by which the eyeglasses may be adjusted to the front or rear to compensate for varying lengths in the eyelashes of different wearers or for pupillary distance or other similar purposes.

In carrying out my invention I provide two lower guards each consisting of a block-like member carrying the usual blade or pad, said member having a curved arm provided with a series of cut-outs arranged to receive a set-screw whereby said guard is adjustably secured to the stud of the lens-frame on the same plane with the latter. A pair of upper guards is also provided, the same having each a lower shank arranged to be engaged by the set-screw, the upper portion thereof being curved rearwardly and downwardly and supporting any desired form of blade or pad at its end. By loosening the set-screw the relative positions of the guards may be varied at will.

The invention will be hereinafter fully set forth, and particularly pointed out in the claims.

In the accompanying drawings, Figure 1 is a view in perspective illustrating my invention. Fig. 2 is a similar view with the lower guards interchanged. Fig. 3 is a sectional view on the line 3 3, Fig. 1. Fig. 4 is a sectional view on the line 4 4, Fig. 3. Figs. 5, 6, 7, 8, and 9 are details.

Referring to the drawings, 10 designates the usual lens-supporting frame, having the studs 11, the outer ends of the latter being provided with parallel flanges 12. The lower guards 13 13' each comprise a block-like member 14, having flanges 15 to receive the usual blade or pad 16, said flanges also forming a shoulder 17. The upper portion of the said guard is extended and curved to form an arm 18, which is provided with a series of two or more cut-outs or notches 19, the latter being designed to receive the reduced portion 20 of a recessed set-screw 21 working in stud 11. The head 22 of said screw serves to clamp the arm 18 in position between the flanges 12. The upper guards 23 each comprise a shank 24, curved to conform to the lower guard and secured between the latter and one of the flanges 12 by means of the recessed set-screw 21. The upper portion of the guard 23 is extended rearwardly on a compound curve to form an arm 25, said arm also being curved or bent downwardly. The end of arm 25 is enlarged at 26 to support a cone-like member 27, to which a circular blade or pad 28 is secured, said cone-like member being loosely mounted to form a substantially universal bearing. The blades or pads 16 and 28 may be made in any form of cork, shell, metal, xylonite, or any other preferred material.

In practice when it is desired to fit a pair of my improved eyeglasses the set-screw 21 is loosened and the upper guards 23 are raised or lowered, as may be necessary, so that when applied to the wearer the blades thereof will engage the fleshy part of the nose above the bone and directly between the eyes, said set-screw being tightened just as soon as the desired adjustment is secured. This adjustment is regulated, of course, to bring the axis of the lens in line with the pupil of the eye. When the adjustment is properly secured, the blades or pads 28 grasp the nose and firmly support the eyeglasses, the blades or pads 16 serving to hold as well as steady the latter. It sometimes happens that this adjustment can also be secured by merely bending the arm 25 in or out or backward or forward in the desired direction. If it be found desirable to move the glasses forward, as for a person with long eyelashes, it is only necessary to interchange the guards 13 13' (see Fig. 2) and adjust as before, the eyeglasses being thus supported farther from the eyes a distance equal to the width of arm 18.

The advantages of my invention are at once apparent. It is well known that the faces of different people vary in size, and it has always been a serious problem to center the lenses properly with relation to the pupil of the eyes. This has usually been done by employing a series of guards of varying sizes and substituting one for the other until the proper adjustment is secured. By means of my invention this desirable adjustment can be secured without the substitution of other guards, it only being necessary to regulate the relative positions of the upper and lower guards.

A further advantage lies in the manner in which my improved eyeglasses are supported. By causing the upper blades to engage the fleshy part of the nose above the bone the liability of slipping is reduced to a minimum, and as the lower guard serves to steady the glasses they may be arranged on the same plane as the lenses, thus presenting a more sightly appearance than when arranged on a different plane. The universal bearing of the upper blades also enables the latter to press firmly against the nose no matter what the angle of the guards may be. It will also be observed that by arranging the lower guards so as to be exchanged a simple means is provided for securing a front and rear adjustment.

My invention also possesses an additional advantage, in that it can be applied to eyeglass-frames already in general use and now being handled by the trade.

I claim as my invention—

1. An eyeglass comprising a lens-supporting frame, upper and lower guards carried thereby, said upper guards having rearwardly-extended curved arms capable of being bent in any desired direction, and means whereby said upper guards may be shifted from one side to the other of said lower guards, as set forth.

2. An eyeglass comprising a lens-supporting frame, upper and lower guards carried thereby, said upper guards having downwardly-curved, rearwardly-extended arms which are bent laterally in the form of a compound curve, and means whereby said upper guards may be shifted from one side to the other of said lower guards, as set forth.

3. An eyeglass comprising a lens-supporting frame, upper and lower guards having shanks the contiguous longitudinal edges of which fit flush against each other throughout their lengths, and means for supporting said guards whereby they may be adjusted longitudinally with relation to each other and said upper guards may be shifted from one side to the other of said lower guards, as set forth.

4. An eyeglass comprising a lens-supporting frame, lower block-like guards supported thereby, upper guards having depending shanks adjustably mounted with relation to said lower guards and provided with rearwardly-extended curved arms capable of being readily bent in any desired direction, and blades or pads carried by said guards, as set forth.

5. An eyeglass comprising a lens-supporting frame, lower block-like guards supported thereby, blades or pads carried by said guards, upper guards adjustably mounted with relation to said lower guards and having rearwardly-extended curved arms capable of being readily bent in any desired direction, and blades having a substantially universal bearing supported by said arms, as set forth.

6. An eyeglass comprising a lens-supporting frame, upper and lower guards carried thereby, blades or pads carried by said guards, and means whereby said upper guards may be shifted laterally to regulate the position of the lens with relation to the eye, as set forth.

7. An eyeglass comprising a lens-supporting frame, upper guards carried thereby, interchangeable lower guards also carried by said frame, and blades or pads carried by said guards, said upper guards being capable of lateral adjustment when said lower guards are interchanged, whereby the position of the lens may be regulated with relation to the eye, as set forth.

8. An eyeglass comprising a lens-supporting frame, lower interchangeable guards carried thereby, upper guards also carried by said frame and capable of vertical and lateral adjustment, whereby the position of the lens may be regulated with relation to the eye, and blades or pads carried by said guards, as set forth.

9. An eyeglass comprising a lens-supporting frame, upper and lower guards having shanks arranged to fit flush against each other throughout their lengths, set-screws working in said frame and having each an annular recess or offset to receive said shanks, and pads or blades carried by said guards, as set forth.

10. An eyeglass comprising a lens-supporting frame, set-screws carried thereby and provided with an annular recess or offset, lower guards having arms or members provided with cut-outs arranged to receive said offsets, upper guards adjustably supported by said screws, and blades or pads carried by said guards, as set forth.

11. An eyeglass comprising a lens-supporting frame, set-screws carried thereby, lower guards provided with longitudinal shoulders having arms or members engaged by said set-screws, upper guards having shanks also engaged by said set-screws and bearing against the shoulders of the lower guard, and blades or pads carried by said guards, as set forth.

12. An eyeglass comprising a lens-supporting frame, set-screws carried thereby, lower guards supported by said screws, upper guards having shanks also engaged by said members, said upper guards being provided with downwardly-bent rearwardly-extending arms, said arms being also bent in the form of a compound curve, and blades or pads carried by said guards, as set forth.

13. An eyeglass comprising a lens-supporting frame, upper and lower guards adjustably mounted in said frame and having their contiguous longitudinal edges fitting flush against each other, said upper guards having rearwardly-extended arms capable of being readily bent in any direction to fit the wearer, and means whereby said upper guards may be shifted from one side to the other of said lower guards, as set forth.

In testimony whereof I have signed this specification in the presence of two subscribing witnesses.

WILLIAM C. NEWMAN.

Witnesses:
J. W. COOK,
PAGE SEIBERT.